United States Patent [19]

Wolicki et al.

[11] Patent Number: 4,529,884
[45] Date of Patent: Jul. 16, 1985

[54] SPECTRAL DOSIMETER

[76] Inventors: Eligius A. Wolicki, 1310 Gatewood Dr., Alexandria, Va. 22307; Charles S. Guenzer, 34-16th St. SE., Washington, D.C. 20003

[21] Appl. No.: 421,276

[22] Filed: Sep. 22, 1982

[51] Int. Cl.³ .............................................. G01T 1/22
[52] U.S. Cl. .................................................. 250/370
[58] Field of Search ........... 250/370 C, 370 F, 370 K, 250/370 R, 390

[56] References Cited

U.S. PATENT DOCUMENTS 2,867,727  1/1959  Welker et al. ................... 250/370 C
4,087,692  5/1978  Lecuyer et al. ................. 250/370 F Primary Examiner—Janice A. Howell
Attorney, Agent, or Firm—Charles S. Guenzer

[57] ABSTRACT

A spectral dosimeter for detecting both the fluence and the energy spectrum or ionization density spectrum of high energy radiation comprising multiple MOS capacitors on a single semiconducting integrated circuit chip which collect ionization charge generated by high energy particles passing in the vicinity of the individual capacitors. The capacitors are individually read by comparison with reference capacitors. The capacitors are fabricated or operated such that varying amounts of collected charge will cause the capacitors to be read as having collected a threshold amount of charge.

9 Claims, 6 Drawing Figures

SPECTRAL DOSIMETER

BACKGROUND OF THE INVENTION

1. Field of the Invention

This invention relates in general to dosimeters for detecting high energy radiation and in particular to spectral dosimeters for measuring both the spectrum and fluence of that radiation.

As used in this application high energy radiation includes those types of radiation with energy above about 100 keV. Such radiation includes electrons, protons, neutrons, accelerated ions, cosmic rays, gamma rays, muons and other nuclear particles. Dosimeters as used in this application means any device which measures such radiation or the ionization resulting from such radiation.

2. Description of the Prior Art

High energy radiation often needs to be measured for two general reasons, either to characterize the radiation itself or to measure its effect upon another body. This area of instrumentation is referred to as dosimetry with the individual instruments called dosimeters. Dosimeters tend to present ambiguous results in the respect that no one instrument can definitively distinguish different types of high energy radiation over a range of energies. Stated alternately, the radiation needs to be somewhat characterized beforehand for a dosimeter to better characterize the radiation field still better. An excellent dosimetry textbook is the multi-volume treatise Radiation Dosimetry, edited by Frank Attix and William C. Roesch.

Because the radiation fields themselves are usually not as important as the effects that the radiation produces on other bodies, many dosimeters do not concentrate on particle or photon counting but instead attempt to measure the effect produced by the radiation. An important type of dosimeter of this type measures directly the ionization produced by a variety of nuclear radiations and high energy photons. Ionization is the process by which uncharged atoms in the target material have their negatively charged electrons separated from their positively charged ions, in this case by high energy radiation. For instance, a charged nuclear particle interacting with semiconductor grade silicon will create one electron-hole pair for every 3.6 eV of energy which the particle loses. This relationship generally holds for charged particles of over 40 keV and depends on the volume of the silicon being large enough to stop the particles to which the momentum of the nuclear particles is transferred. Dimensions of a few micrometers are generally sufficient.

Ionization from nuclear radiation is a fundamental measurement of nuclear radiation. Three separate quantities are used as measures of the ionization effects of radiation upon various materials. A roentgen is the quantity of radiation which produces one electrostatic unit of charge in 0.001293 gram of air. A rad is the quantity of radiation which deposits 100 ergs of energy per gram of whatever material with which it interacts. Thus a rad needs to be referenced to whatever material is being considered. For instance a rad(Si) of radiation differs from a rad(C) of radiation since the same number of particles of whatever radiation will deposit somewhat different energy in silicon than in carbon. A rem (roentgen-equivalent-man), used in biological studies, includes a correction factor for relative biological effectiveness of the radiation upon the biological system. Luckily the rem and various rads for many radiations and target materials differ from each other by less than 20 percent.

Until now, this discussion has assumed that a radiation field produces uniform effects. However for most high energy radiation at reasonable levels, the distribution of energy or damage within that material is rather disperse. The primary radiation particle (a photon will be considered a particle) in interacting with the material usually interacts with individual atoms or nuclei. The interactions are infrequent but when they do occur a large quantum of energy is transferred from the primary particle to the secondary particle which is the atom that includes the nuclei involved in the interaction. The now energetic and charged secondary particle usually deposits its energy via ionization along a path of a few micrometers or less. In the region of the path of the secondary particle, the ionization density is quite high. Values of $10^8$ rads have been estimated in the core of the path of the secondary particle.

Another situation that results in widely dispersed ionization results when heavy cosmic rays pass through a target. The cosmic rays of interest here are atoms of weight ranging from that of helium to iron, which originate from the sun or other far reaches of the universe. Typical energies are in the GeV range. However the heavier ones produce the densest ionization damage when they have slowed down to the 0.1 to 10 MeV per nucleon range at which point they are depositing ionization energy in a dense track.

The specialized area of dosimetry which is concerned with the amount of energy deposited locally in a small volume of material, rather than an average energy density over a much large volume, is called microdosimetry. Microdosimetry becomes of importance when the functional unit affected by the radiation is small and effects of single particles become important. Such instances occur for damage to living cells or to microelectronic elements for which overall dimensions are of the order of micrometers and for which single nuclear particles can deliver damaging amounts of energy.

Previous instrumentation usable for determining the spectrum of radiation (what will be called a spectral dosimeter) has tended to be bulky and specialized. If the high energy particle is ionized, it can be passed in a vacuum through a magnetic field transverse to its path. Since the deflection is proportional to $q/m \cdot v \times B$, where q is the particle's charge state, m its mass, v its velocity and B the magnetic field. The resulting position distribution recorded on film or by particle counters can be related to the particle's kinetic energy if its charge state and mass are known. However magnets are bulky and heavy and the raw data needs extensive processing to provide a spectral distribution.

Other types of instrumentation rely on the ionization produced by an ionized particle in the depletion region of a semiconductor. An ionized particle in traversing silicon creates on electron-hole pair for every 3.6 eV of energy that it loses. In the depletion region a strong electric field exists which separates the electrons and holes to their respective electrodes so that the collected charge measures the energy lost by the particle. The usual semiconductor particle detector has macroscopic area and is made with its depletion region on the order of a millimeter thick or more. As a result, the particles stop within the depletion region and their total energy is measured.

If the semiconductor particle detector is made very thin, on the order of a few micrometers, then the particle loses only a small fraction of its energy in traversing the detector. As a result, the detector measures the ionization density of that particle at its incident energy. These semiconductor particle detectors are specialty items and are expensive. They are particle counters so that fast electronics are needed to support them if the particle flux rates are high.

SUMMARY OF THE INVENTION

Accordingly it is an object of this invention to provide a spectral dosimeter that measures both the energy spectrum and the fluence of high energy particles.

It is a further object of this invention to provide a spectral dosimeter that measures the microdosimetric ionization density of high energy particles.

It is yet a further object of this invention to provide a spectral dosimeter that is small, portable, and inexpensive.

It is still another object of this invention to provide a spectral dosimeter operating in real-time.

The invention is a spectral dosimeter comprising multiple charge-collecting elements on a single integrated circuit chip which can be interrogated individually, much like a random-access-memory. The charge-collecting elements accumulates charge originating from ionizing nuclear particles passing in the vicinity of the elements. The elements are interrogated by comparing the amount of charge stored on a charge-collecting element with that on a reference element. One of two signals is output depending on whether the stored charge is greater or less than the reference charge.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
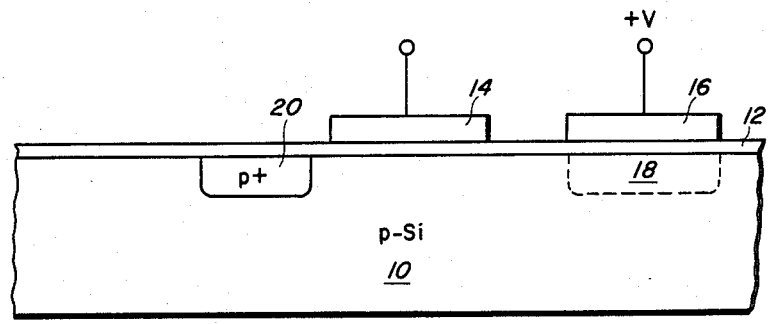
FIG. 1 is a cross-section of an MOS dynamic memory cell as practiced in the prior art.

Referring now to the drawing, wherein like reference numerals designate identical or corresponding parts throughout the several views, In recent years, a number of experimentalists have shown that integrated electronic circuits used for memory circuits are susceptible to radiation effects at very low radiation levels. Single nuclear particles have been shown to upset individual memory cells in these integrated circuits (ICs). The memory design most sensitive to single particle effects have been the dynamic random-access-memories (dRAMs), which are built with metal-oxide-semiconductor (MOS) technology. U.S. Pat. Nos. 4,164,751 and 4,334,236 give examples of such a dRAM. The basic structure of a single cell of a dRAM is shown in FIG. 1. The substrate 10 is fabricated of silicon, preferably doped to be p-type. On top of the silicon substrate 10 is grown a thin layer of gate oxide 12. Over the the gate oxide 12 are placed a gate electrode 14 and a capacitor electrode 16. These two electrodes 14 and 16 may be formed of aluminum or polysicon or other appropriate conductors. The capacitor electrode 16 is permanently biased, positively for p-type silicon, and typically at 5 volts for memory circuits, so as to form an inversion region 18 in the silicon substrate 10. On the side of the gate electrode 14 away from the capacitor electrode 16 a portion of the silicon substrate 10 is heavily doped of the same type as the substrate 10 so as to be a good conductor. The heavily doped region 20, p+ in this case, will be called a bit line contact although it may be the bit line itself. The combination of bit line contact 20, gate electrode 14 and inversion region 18 forms a MOS transistor. When the gate electrode 14 is turned on, i.e. a sufficiently high positive voltage in this case applied, there is a high conductivity path between the bit line contact 20 and the inversion region 18. Otherwise the inversion region 18 is effectively isolated from the bit line contact 20 when the gate electrode 14 is turned off.

The inversion region 18 when in equilibrium contains more minority carriers, electrons in this case, than majority carriers. However the thermal generation rate of minority carriers is rather low so that for times on the order of milliseconds to seconds in high quality silicon the inversion region 18 is not necessarily in equilibrium, i.e. there may be a deficiency of electrons therein. The principle of operation of the dRAM relies on the unstable state which may be maintained in the inversion region 18. The memory cell may be put into the LOW state by impressing a zero voltage on the bit line contact 20 and turning on the gate electrode 14. As a result, the inversion region has its equilibrium number of minority carriers, electrons. However if the bit line contact 20 is held at a positive voltage comparable to that of the compacitor electrode 16 and the gate electrode 14 is turned on, then the minority carrier electrons are drained from the inversion region 18. If the gate electrode 14 is thereafter turned off the memory cell will be left in a HIGH state. Thus the amount of minority charge remaining in the inversion region 18 for a period of milliseconds will depend on the voltage impressed on the bit line contact 20 when the gate electrode 14 had been on. Of course, the memory needs to be refreshed, i.e. read and rewritten, every few milliseconds for typical present day memories, but this is routinely accomplished with use of microprocessors and integrated circuits. In summary, the inversion region 18 is said to be in the HIGH state when it is depleted of minority carriers. Conversely when it is in thermal equilibrium or more nearly in equilibrium it is in the LOW state.

When the inversion region 18 is in the HIGH state, it serves as a detector of ionizing radiation. This radiation creates electron-hole pairs along and immediately surrounding its track. By various mechanisms, the electrons and holes can be separated and part of the minority charge can end up in the inversion region 18 if the inversion region is deficient of the equilibrium density of minority charge and the particle track is sufficiently close to the inversion region 18.

Figure 2:
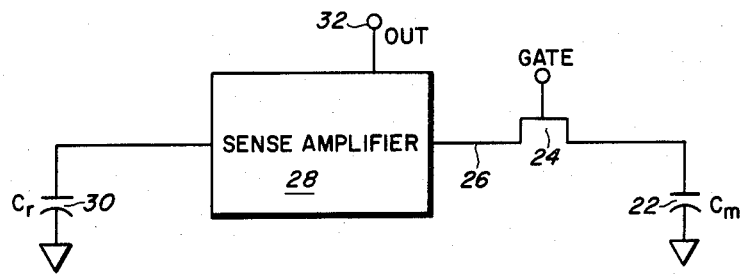
FIG. 2 is a schematic representation of the equivalent electrical circuit of an MOS dynamic memory and its sense amplifier as practiced in the prior art.

In FIG. 2 is shown the equivalent electrical circuit of the memory cell already described. The positively biased capacitor electrode 16, separated by the oxide 12 from the inversion region 18 forms an MOS capacitor 22. The gate electrode 14, separated by the oxide 12 from the p-silicon 10 forms an MOS gate 24 or transistor. The bit line contact 20 is directly connected to the bit line 26 which is a good conductor. The bit line 26 connects the gate 24 to the sense amplifier 28. The MOS capacitor 22 serves as the storage element in a memory or the ionization collector in this dosimeter. It is in its LOW or uncharged state when the inversion region 18 is in thermal equilibrium and it remains in a HIGH or charged state when there is a sufficient deficiency of minority charge in the inversion region 18.

A dynamic RAM memory cell is read by the sense amplifier by comparing the charge residing on the memory capacitor 22 and a reference capacitor 30. In conventional operation, the reference capacitance 30 is designed to be slightly smaller than the sum of the memory capacitance 22 and the substantial capacitance associated with the bit line 26. Just before the memory capacitor 22 is to be read, the reference capacitor 30 and the bit line 26 are precharged to the voltage corresponding to a HIGH on the memory capacitor 22. Then the gate 24 is switched on. The sense amplifier 28 contains a bistable amplifier which compares the voltages on the reference capacitor 30 with the voltage seen on the bit line 26. The bistable amplifier 28 then drives the side with the lower voltage to zero voltage and the side with the higher voltage to the precharge voltage. The sense amplifier 28 then drives the output line 32 to the voltage on the bit line. As a result, the output line 32 becomes HIGH if the voltage on the memory capacitor 22 is equal to or greater than the precharge voltage. On the other hand, the output line 32 becomes LOW if the voltage on the memory capacitor 22 is less than the precharge voltage.

Figure 3:
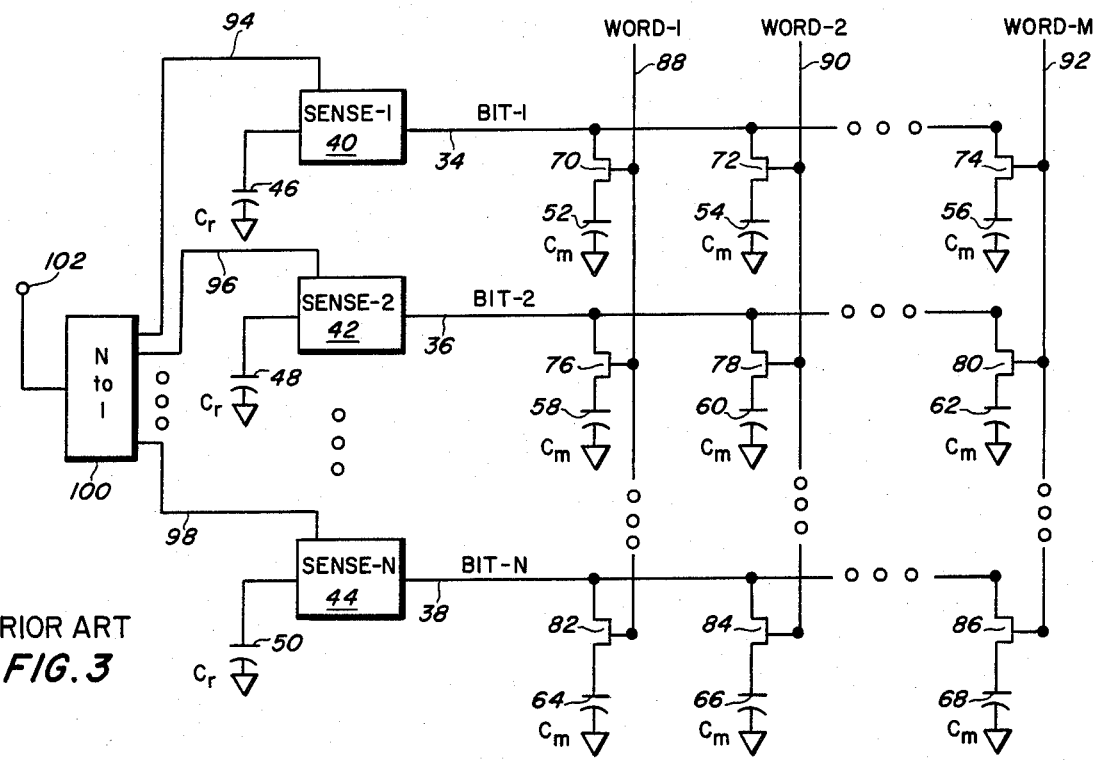
FIG. 3 is a schematic representation of the equivalent electrical circuit of an MOS integrated circuit dynamic random-access-memory as practiced in the prior art.

A large scale dynamic RAM memory is set up as shown in FIG. 3. There are M×N memory cells, all made as identical to each other as possible. State-of-the-art dRAMs have M and N as large as 512 or 1024. There are N bit lines 34, 36, and 38, N sense amplifiers 40, 42, and 44, and 44, and N references capacitors 46, 48, and 50, all of value $C_r$. On each bit line there are M memory capacitors 52, 54, 56, 58, 60, 62, 64, 66, and 68 each of value $C_m$. Each capacitor is controlled by a gate 70, 72, 74, 76, 78, 80, 82, 84, or 86, again all being identical. The memory cells are read in parallel, one per bit line, as controlled by one of the M word lines 88, 90, and 92, connected in parallel across the bit lines 34, 36, and 38. Further multiplexing on the N output lines 94, 96, and 98 in the N-to-1 switch 100 provides the single output line 102 for all M×N memory cells. The process of reading one cell on a word line also refresheds all cells on that word line to a good HIGH or a good LOW. For RAM applications, additional circuitry is provided so that an individual cell can be set HIGH or LOW without disturbing the other M×N−1 cells.

The dynamic RAMs of the type shown in FIG. 3 have been the subject of much investigation for its sensitivity to ionizing radiation. May and Woods in IEEE Transaction of Electronic Devices, vol. ED-26, page 2, 1979, have shown that there is a minimum energy alpha particle (doubly charged helium ion) which can upset these cells. Because for each electron-hole pair there is absorbed 3.6 eV of ionizing energy in silicon, this minimum energy can be restated as $Q_{crit}$, the amount of charge necessary to discharge a HIGH memory capacitor 22 to the point that the sense amplifier 28 reads it as a LOW. Other radiation experiments on similar types of RAMs have shown that there is a threshold of ionization density as well as an energy threshold that causes upset. The density threshold arises from the fact that the ionized charge can be collected only from the part of the particle track within the inversion region 18 and for a finite distance extending into the substrate 10 from the inversion region 18. Although it was originally thought that this distance was equal to the minority diffusion length, more recent work has demonstrated that the charge collection mechanisms are complicated by the high charge densities created which cause field-driven charge transport. Generally speaking it is a fair approximation that a particle the path of which passes near (with a few micrometers of) the inversion region 18 will for a given energy deposit a given amount of charge in the inversion region 18. Furthermore the greater the ionization density created in the track of the particle, the greater the charge collected.

These radiation experiments have further shown that upsets in the dRAM shown in FIGS. 2 and 3 are accumulated. Once an ionizing particle has deposited $Q_{crit}$ in an inversion region 18 that was previously HIGH, that cell will be LOW. Upon being refreshed, that discharged cell will be set at a good LOW during the refresh operation. Conversely if the inversion region 18 is partially discharged but by less than $Q_{crit}$, then the refresh operation returns that cell to a good HIGH. The cell thus needs to be read only intermittently.

The prior art has assumed that every cell in a memory has the same $Q_{crit}$ that characterizes it although more complete analyses have shown that there are separate values of $Q_{crit}$ associated with the bit line 26 and the reference capacitor 30. In addition, due to manufacturing variabilities and dynamic circuit effects, there is a narrow distribution, generally uncontrollable, of $Q_{crit}$ associated with each of these elements.

This invention involves a single RAM-like dosimeter for which different cells are fabricated on a single semiconducting integrated circuit in a controlled fashion so that $Q_{crit}$ varies in a known fashion from cell to cell. The cells are all initially set HIGH. Then when the dosimeter is read after being exposed to a radiation field consisting of energetic particles (a photon will here be considered a particle), the distribution of cells which have been upset can be correlated with a range of ionization densities of the radiation field. The cells must be read frequently enough so that there is a low probability of a double hit, i.e. two separate high energy particles depositing charge during a single accumulation period. After being read, any LOW cell is reset HIGH.

Figure 4:
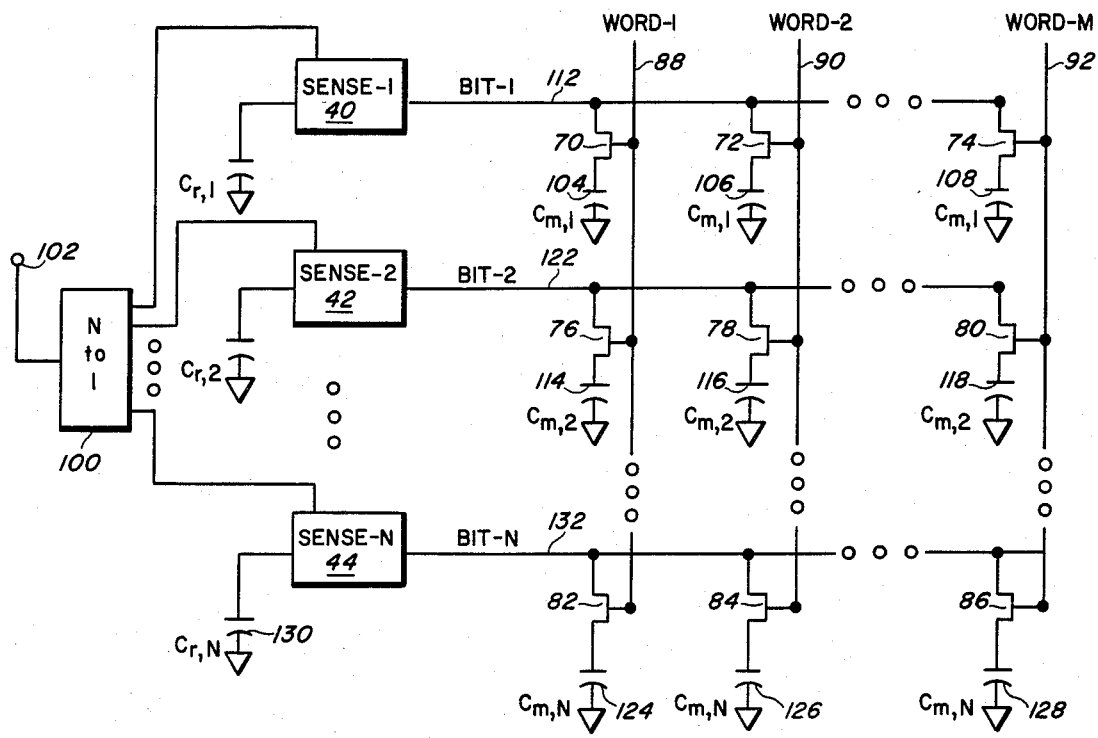
FIG. 4 is a schematic representation of the equivalent electrical circuit of an MOS spectral dosimeter.

The most straightforward implementation as shown in FIG. 4 closely resembles the MOS RAM of FIG. 3 with the major exception that the capacitances vary from row to row. All the memory capacitors 104, 106, and 108 in the first row have values close to $C_{m,1}$, the capacitance $C_{r,1}$ of the first row reference capacitor 110 is somewhat less than the sum of $C_{r,1}$ and the capacitance associated with the first row bit line 112. Likewise for the second row, where all the memory capacitor 114, 116, and 118 have nearly the values $C_{m,2}$ which is similarly matched by the reference capacitor 120 and bit line 122. The same description extends through all rows to the Nth row with memory capacitance $C_{m,N}$ 124, 126 and 128, reference capacitance $C_{r,N}$ 130 and bit line 132.

The values of the capacitances $C_{r,1}$, $C_{r,2}$ through $C_{r,N}$, herein commonly called $C_{r,n}$, are chosen to span a range of values such that different rows have different values of $Q_{crit}$ that will cause the memory cells of the different rows to upset from a HIGH to a LOW. The distribution of upset memory cells from row to row, i.e. as a function of $Q_{crit}$, provides a measure not only of the number of particles but also of their distribution in energy. That is, the invention provides a spectral dosimeter on a single microelectronic chip that produces both a spectrum of the nuclear particles of photons and their fluences.

Figure 5:
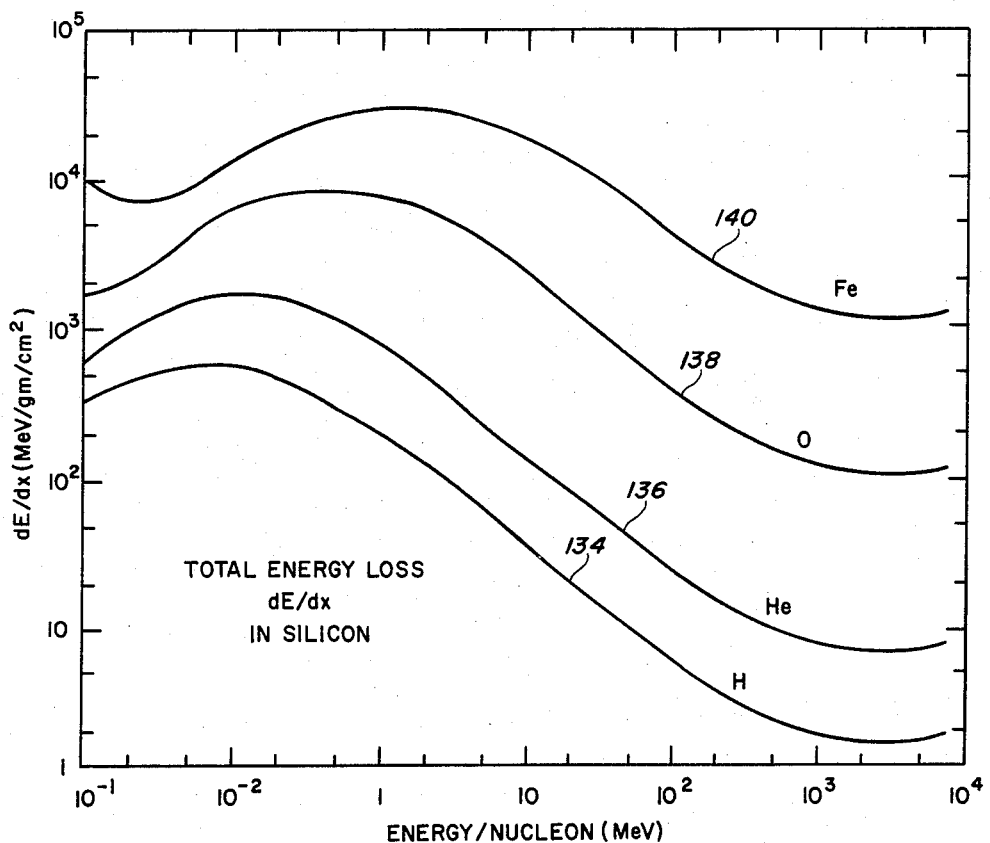
FIG. 5 is a graph of the ionization charge density deposited by a particle as it traverses silicon as a function its energy. The energy on the horizontal axis is given per nucleon of the particle.

The spectral dosimeter provides a spectrum of ionization densities averaged over dimensions which approximate the inversion region 18. This spectrum is itself of importance for many microdosimetric studies in which the dimensions of interest are those of the inversion region 18 and the ionization and its density are required to be measured. However the spectral dosimeter has the further property of being useful for the measurement of the particle energy spectrum. This property requires a knowledge of which type particles are incident upon the dosimeter, e.g. protons. In FIG. 5 is graphed the deposition of ionization energy along the track of an energetic particle as a function of its energy. Curve 134 gives the ionization density for a proton, i.e. hydrogen. Curve 136 gives the ionization density for an alpha particle, i.e. helium. Curves 138 and 140 give the values for oxygen and iron respectively. Particles with intermediate mass will have curves falling between those given in FIG. 5. At energies over about 1 MeV per nucleon but less than 1 GeV, the ionization density along a track of a particle decreases monotonically for increasing energies. Therefore a knowledge of the distribution of ionization densities can be used to calculate, from well known curves such as those given in FIG. 5, the energy spectrum of the incident particles.

In a spectral dosimeter using MOS capcitors as charge collection elements, the value of the capacitance, $C_{r,n}$ or $C_{m,n}$, can be varied by any of the parameters affecting the capacitance of the inversion region 18 shown in FIG. 1. The easiest method is to vary the lateral physical dimensions of the capacitor electrode 16 since its capacitance is proportional to its area. Another technique for varying the capacitance from row to row is to vary the bias voltage applied to the capacitor electrode 16. Since the size and depth of the inversion region 18 varies with the bias voltage on the capacitor 16, the amount of charge in that region will vary with the bias voltage, which is equivalent to a variation of the memory capacitance $C_{r,n}$ or $C_{m,n}$. Other possible techniques for varying $C_{r,n}$ or $C_{m,n}$ involve varying the doping density in the substrate 10 from row to row or varying the thickness of the oxide 12. However such approaches cannot be performed by standard IC processing and therefore are not expected to be advantageous.

Yet another approach combines analog and digital techniques. In the first embodiment of this approach, the memory capacitors are not set to a single voltage at the start of the recording period. Instead the voltage or alternatively the charge impressed on the capacitor varies from row to row so that a different amount of ionization charge is required to discharge the memory capacitors of each row below the point that will be read as a LOW state.

In a second analog-digital embodiment, the memory capacitors are charged to the same voltage but the reference capacitors of each row are precharged to a different voltage, so that each row has a different voltage point corresponding to the dividing point between HIGH and LOW states. Of course, it is also possible that different voltages be impressed at different values from one write/read cycle to the next. This temporal variation does require additional circuitry to vary the operating voltage as a function of time on one or the other of the charging circuits. Operationally, the temporal variation means that if the radiation arrives in a short burst, then the $Q_{crit}$ of the detecting cell is set at a level that does not necessarily correspond to that of the radiation and the required spectral information may be lost.

The spectral dosimeter can be used not only to detect directly ionizing particles, but also uncharged particles such as neutrons which do not directly ionize by the use of neutron reaction materials. Guenzer, Wolicki and Allas described in IEEE Transactions on Nuclear Science, volume NS-26, pages 5048–5052, 1979 that a silicon MOS dRAM is sensitive to upset from neutrons. Neutrons have a significant cross-section (about 100 millibarns at 14 MeV) for the production of alpha particles from silicon. The resulting alpha particle itself is ionizing and generally of sufficient energy to upset a properly designed MOS memory capacitor. The resulting alpha particle has a maximum energy that is 2.75 MeV less than that of the neutron with an energy distribution corresponding to approximately isotropic scattering. Alternatively a hydrogenous radiator composed of hydrogen rich material will interact with neutrons to produce protons. The maximum energy of the resultant protons equals that of the incident neutron. Thus a distribution of ionization densities, i.e. $Q_{crit}$, can be correlated to an energy distribution of neutron energies. The structure for the hydrogenous radiator is shown in FIG. 6 in which a neutron reaction layer 142 is placed adjacent to the charge collection element of the capacitor electrode 16 and the inversion region 18.

Figure 6:
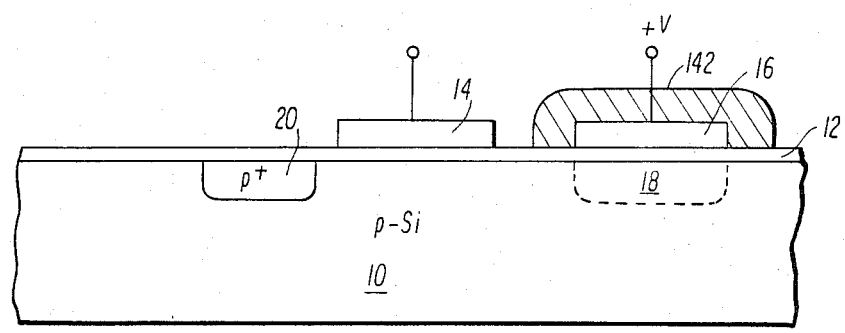
FIG. 6 is a cross-section of an MOS dynamic memory cell with a layer of neutron reaction material.

Furthermore Guenzer et al. in IEEE Transactions on Nuclear Science, volume NS-27, pages 1485–1489, 1980 have pointed out how thermal neutrons can produce upsets from the large cross section for alpha particle production with boron-10, either as a dopant in the silicon substrate or an absorber 142 adjacent to the memory capcitor as illustrated in FIG. 6. The corresponding use of lithium-6 produces similar results with high energy neutrons because of its high cross section. The neutron reacting material need not be isotopically pure. The efficiency for the production of alpha particles of naturally occuring boron or lithium is reduced from that of pure boron-10 and lithium-6 but is still satisfactory. Indeed the neutron reaction material may be one component of a chemical compound or a mixture of atomic species, e.g. boron doping of silicon.

Because the spectral dosimeter of this invention behaves much like a random-access-memory that is used in a computer system, it is to be appreciated that the spectral dosimeter can be easily integrated into an electronic system that controls the dosimeter and processes the data produced by it. One or more spectral dosimeters can be inserted into the memory space of a computer system as was described in the above cited article by Guenzer, Wolicki and Allas. They are then controlled, refreshed, written into, and read just as though they were random-access-memories. The computer can keep a running total of the number of upsets associated with charge collecting elements of different values of $Q_{crit}$. At the end of a preset period or upon reaching some limit triggered by the collected data, the computer can do necessary processing, such as converting an ionization spectrum to a particle's energy spectrum and fluence, with the help of the information contained in FIG. 5, and outputting the results. Most of the computational and processing functions can be integrated onto the same integrated circuit chip occupied by the spectral dosimeter by use of structures commonly found in one-chip microcomputers. The advantage of computerized control is the near real-time operation of the spectral dosimeter. Radiation fields can be characterized and the information output in fractions of a second.

What has been described is a spectral dosimeter comprising multiple charge collecting elements on one integrated circuit chip. The individual elements collect ionization charge from high energy particles passing in the vicinity. The elements are individually read by comparing the charge on the elements with a known reference charge. The output of the comparison means is one of two signals depending on whether the charge on the charge collecting element is larger or smaller than the reference charge. The charge collecting elements or the comparison means are varied such that different cells change from one output state to the other at different values of collected charge.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A spectral dosimeter, comprising:
   multiple ionization charge collecting elements on one integrated circuit chip that accumulate excess charge generated by ionizing high energy particles the tracks of which pass in the vicinity of individual said elements; and
   means for comparing the charge accumulated by each said element against another known quantity of charge, which known charge varies in a known and controlled gradation, each said comparing means being selectively and individually connected to each of a plurality of charge collecting elements.

2. A spectral dosimeter, as recited in claim 1, wherein said charge collecting elements comprise MOS capacitors.

3. A spectral dosimeter, as recited in claim 2, wherein the means for comparing the charge comprise:
   multiple reference capacitors;
   bistable amplifiers each connected to one said reference capacitor and selectively connected to each of a plurality of said MOS charge collecting capacitors, said bistable amplifiers having two outputs states the value of which is determined by which of the reference capacitor and MOS charge collecting capacitor has the higher voltage;
   whereby if a high energy particle has discharged said MOS charge collecting capacitor from a voltage above that of the reference capacitor to a value below, the presence of the high energy particle is noted by a change in the output of the bistable amplifier.

4. A spectral dosimeter, as recited in claims 1 or 3, further comprising a neutron reaction material.

5. A spectral dosimeter, as recited in claim 4, wherein the neutron reaction material is included within the charge collecting element.

6. A spectral dosimeter, as recited in claim 4, wherein the neutron reaction material is placed adjacent to the charge collecting element.

7. A spectral dosimeter, as recited in claim 4, wherein the neutron reaction material comprises one of the group, boron and lithium.

8. A spectral dosimeter, as recited in claim 4, wherein the neutron reaction material consists essentially of hydrogen.

9. A spectral dosimeter, as recited in claims 1 or 3, further comprising computerized circuitry and wherein the spectral dosimeter occupies part of the memory space of said computerized control circuitry.

* * * * *